United States Patent [19]
McKenney

[11] 3,905,160
[45] Sept. 16, 1975

[54] TIRE CONDITIONING APPARATUS

[75] Inventor: John D. McKenney, South Laguna, Calif.

[73] Assignee: Royal Industries, Inc., Osseo, Minn.

[22] Filed: Apr. 26, 1973

[21] Appl. No.: 354,652

[52] U.S. Cl................ 51/106 R; 51/281 R; 157/13
[51] Int. Cl....... B24b 5/00; B24b 29/00; B24b 1/00
[58] Field of Search......... 51/106 R, 51, 104, 33 W, 51/132, 179, 251, 281, 106; 157/13

[56] References Cited
UNITED STATES PATENTS

| | | | |
|---|---|---|---|
| 2,722,784 | 11/1955 | Thiel.................................... | 51/126 |
| 2,831,298 | 4/1958 | Hunter.................................. | 51/179 |
| 3,553,903 | 7/1967 | Christie............................. | 51/106 R |
| 3,574,973 | 4/1971 | Rader................................ | 51/106 R |
| 3,681,877 | 8/1972 | Shively.............................. | 51/106 R |

Primary Examiner—Othell M. Simpson
Attorney, Agent, or Firm—Warren A. Sturm

[57] ABSTRACT

A method and apparatus for conditioning the tires on an automobile to eliminate the effect of radial force variations in which the axle hop of a wheel and tire mounted on the vehicle is used to provide an indication of excessive, undesired force variations under simulated service environments. The indication may be used as a signal to control the operation of a constant force tire grinding device to remove material from at least a portion of the periphery of a tire to bring the axle hop within predetermined allowable tolerances. The apparatus includes retractable wheels or the like to allow it to be properly positioned under the wheel and axle of an automobile.

10 Claims, 6 Drawing Figures

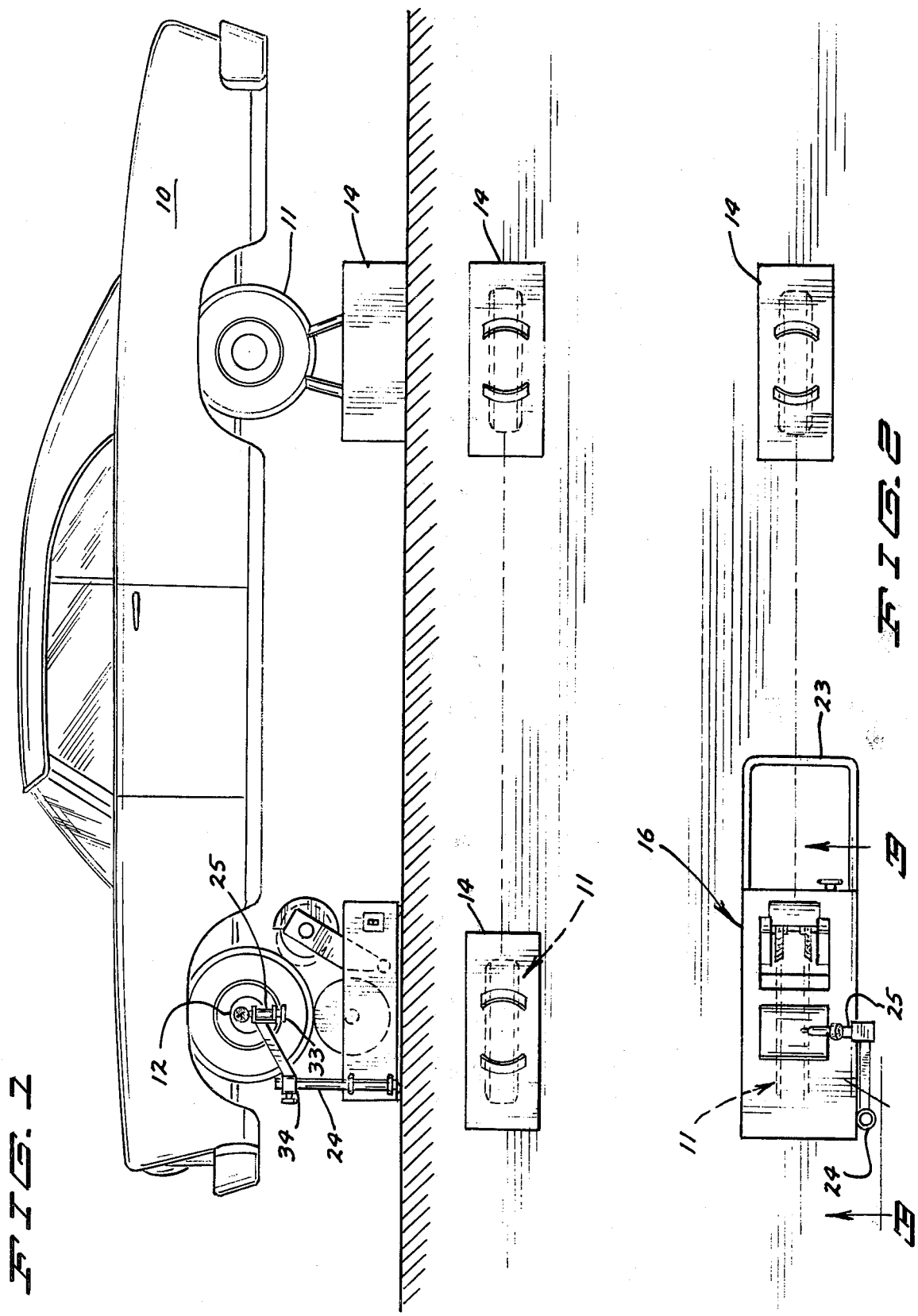

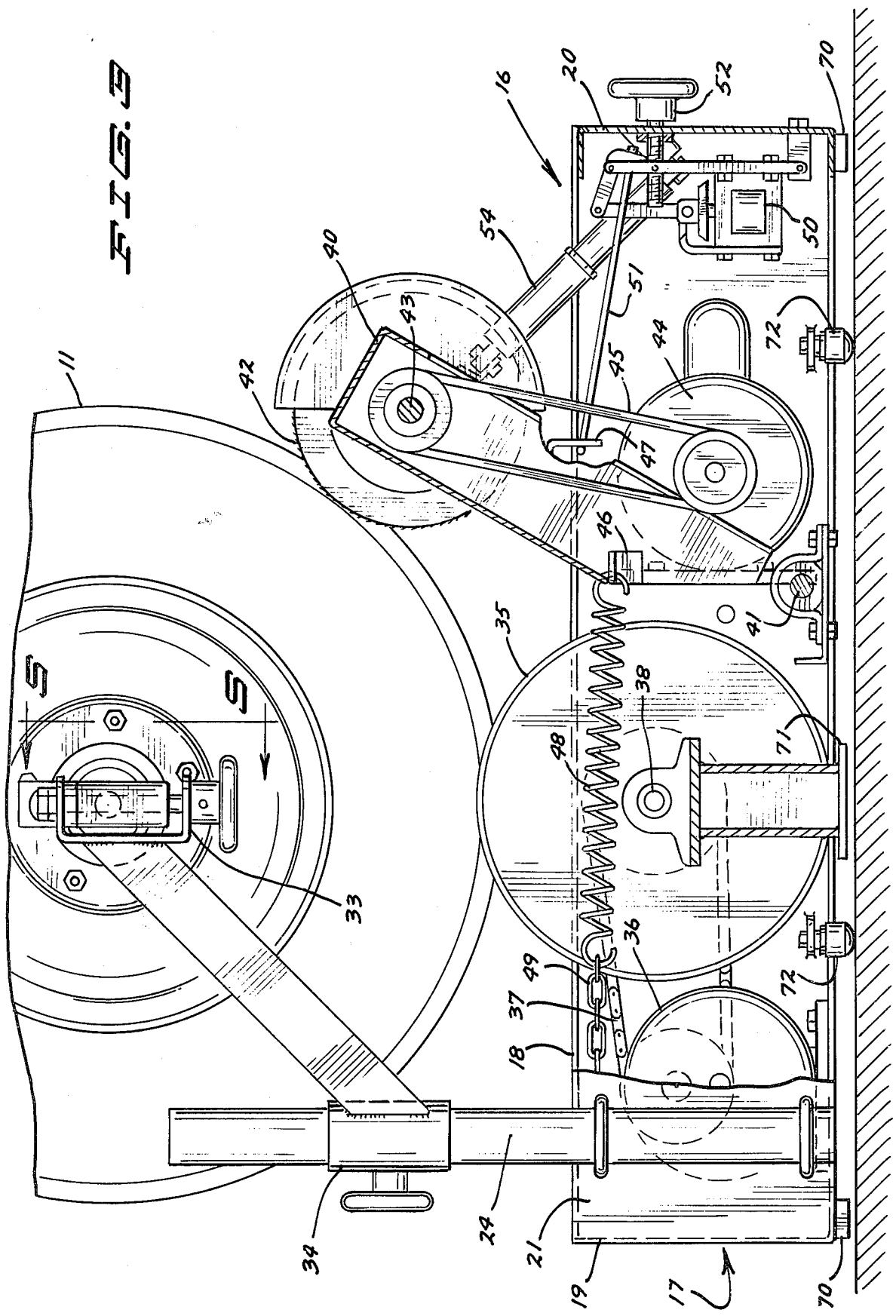

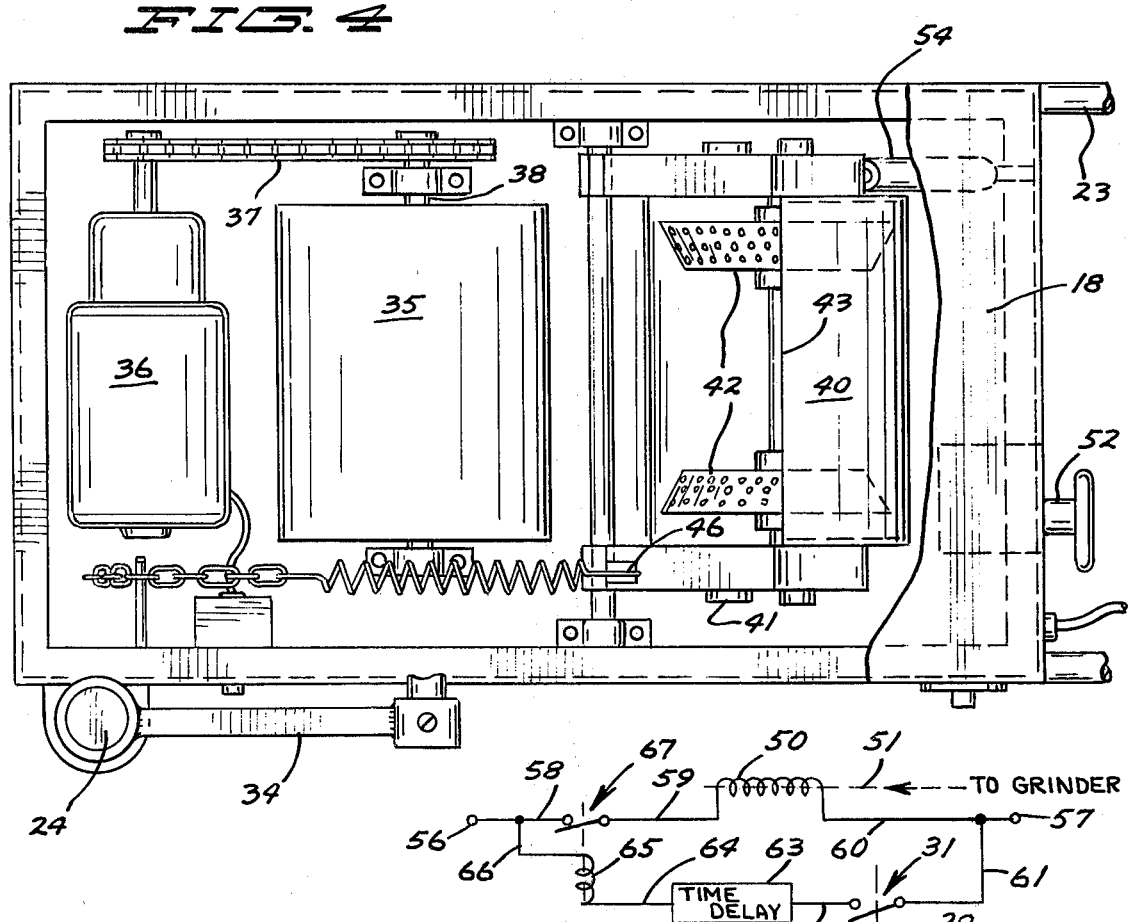
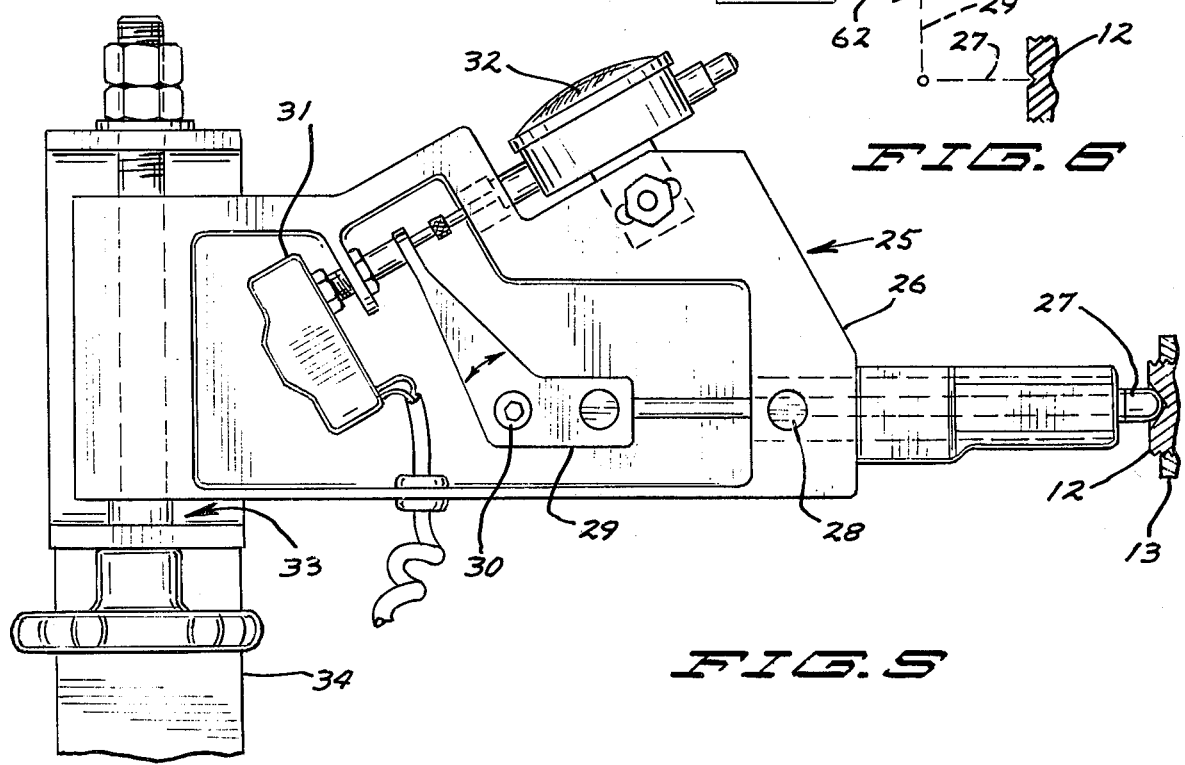

TIRE CONDITIONING APPARATUS

SUMMARY OF THE INVENTION

This invention relates generally to a method and apparatus for the elimination of undesirable forces occurring under the actual operating conditions of an automobile in which such forces present annoying "tire thump" and other phenomena which distract the operator and may cause unnecessary wear and premature failure of the components of the automobile.

Prior art devices have provided various arrangements for attempting to solve this problem. Such prior art devices include tire truing apparatus which is intended to render the outside circumferential periphery of the tire concentric with the axis of rotation of the wheel upon which the tire is mounted. Other such apparatus utilizes a tire grinder to grind away portions of the peripheral circumferential portions of the tire in accordance with a signal derived from a transducer that is disposed on the fender or other portions of an automobile while the tire to be conditioned is rotated upon the axle of the automobile, sometimes under load conditions, as sometimes imposed by the weight of the automobile on the tire. While such systems have provided some relief from the problem, it has been determined that certain improvements are provided by the substance of my invention as will be hereinafter set forth.

In practicing the method and utilizing the apparatus of my invention, it may be seen that a signal is derived from the axle hop of an automobile under loaded conditions as the wheel is rotated and material is ground off of the circumferential periphery of the tire, at selected locations, by a grinder which is urged into grinding engagement with the tire under a substantially constant force, as may be provided by a spring. The apparatus is further provided with features which allow it to be easily moved from one location to another, but which provide for a firm and solid foundation under actual tire conditioning operations.

These and other objects of my invention will become apparent from a consideration of the appended specification, claims and drawings in which:

FIG. 1 is a side elevational view of an automobile disposed on a number of supports, including a tire conditioning apparatus incorporating the principles of my invention;

FIG. 2 is a top view of the illustration of FIG. 1 in which all of the portions of the automobile except for the phantom representations of the wheel and tires have been eliminated for the sake of clarity;

FIG. 3 is an enlarged fragmentary sectional view taken across section line 3—3 on FIG. 2 of the drawing;

FIG. 4 is a fragmentary plan view of the apparatus of FIG. 3 with portions of the housing removed for clarity;

FIG. 5 is an enlarged fragmentary sectional view of a portion of FIG. 3 taken along section lines 5—5; and FIG. 6 is an electrical diagrammatic and schematic drawing of a control circuit for use in carrying out the principles of my invention.

Referring now to the drawings, there is shown an automobile 10 having a plurality of wheel and tire assemblies 11 each of which is mounted on an axle 12 which may include an axle nut 13. It should be noted that the axles on an automobile are most normally provided with a centrally disposed recess and if this is not present on the axle of an automobile, a suitably configured nut may be placed over the axle which may include such a recess and used as if such a recess were present.

The automobile is supported by a plurality of jack stands such as may be seen in a certain copending application Ser. No. D-292,909 filed Sept. 28, 1972, and assigned to the assignee of the present invention, such jack stands are shown to comprise three in number although the end of the vehicle that is not subject to the conditioning method and apparatus may be supported by other means as a jack or lift or the like.

One of the wheels of the automobile is shown supported on the top of tire grinding apparatus 16 which includes a base 17, a top 18, a front 19, a back 20, a side 21, a side 22, a handle 23 and an indicator stand 24. An indicator assembly 25 is shown disposed on a rotating mount 33 which is in turn disposed on a slidable mount 34 which is slidably and rotatably adjustably disposed on indicator stand 24.

Indicator assembly 25 includes a base 26 which contains a feeler lever 27 which is pivotally disposed on a pivot 28 and which is pivotally connected at one end to a transfer lever 29 which is likewise pivotally disposed on a pivot member 30. The other end of feeler lever 27 is adopted to be inserted into the recess normally found on the end of an automobile axle. The other end of transfer lever 29 is shown in engagement and disposed between the actuator for a switch 31 and the actuator for a dial indicator 32 which is in turn adjustably disposed on base 26.

A tire support and driving drum 35 is disposed on a shaft 38 which is in turn rotatably journalled in a pair of pillow blocks which are attached to a pair of support members which are provided with a pad 71 at the lower ends thereof for purposes to be described below. Drum 35 may be suitably driven through a chain 37 from drive motor 36 which may under certain conditions of operation provide a drive speed of approximately 24 revolutions per minute. A grinder base 40 is shown rotatably disposed about a shaft 41 which is likewise journalled for rotation and translation in a pair of suitably mounted pillow blocks at the ends thereof in proximity to the side members of the base of tire grinding apparatus 16. A pair of grinding wheels 42 are shown axially spaced apart on a shaft 43 which extends through suitable bearings disposed in the side of grinder base 40. A motor 44 is connected to shaft 43 through belt 45 and is intended to be operated at a speed suitable for grinding material from the circumferential surface of a tire by using grinding wheels 42 which may take the form of tire rasps which are familiar and well known to those skilled in the art with which this invention pertains.

Grinder base 40 also includes a spring bracket 46 and a solenoid bracket 47. Spring bracket 46 is connected to the front end of base 17 through a spring 48 having a chain 49 disposed at one end thereof to provide for adjustability of tension of spring 48. A solenoid 50 is shown connected to solenoid bracket 47 through a cable 51. Solenoid 50 is connected to cable 51 through a suitable position adjustment means 52. A double acting hydraulic cylinder 54 is shown connected intermediate back 20 and grinder base 40 to provide a damping effect when the grinding wheels are in active tire grinding engagement with the circumferential portions of a tire.

Tire grinding apparatus 16 may be seen to be supportable on a plurality of spring loaded casters, two of which are shown in the sectional view of FIG. 3. The spring loaded casters may also be retractable type casters operable by suitable mechanisms to raise the entire apparatus off of the surface upon which it is operable to allow it to be moved and positioned under the tires of an automobile as required. Base 17 is supported under actual working conditions by pads 70 which may be disposed at the bottom four corners of the apparatus and it will be seen that drive drum 35 that is journalled on shaft 38 is likewise supported by a pair of pads 71 disposed at either ends of shaft 38 in supportive relationship with the pillow blocks in which shaft 38 is journalled.

FIG. 6 shows diagrammatically and schematically one form of control system that might be utilized in conjunction with the apparatus hereinabove described. In FIG. 6 where is shown a pair of terminals 56 and 57 adopted for connection to a suitable source of electrical energy. Terminal 57 is connected to terminal 56 through parallel paths, one comprising conductor 60, solenoid winding 50, conductor 59, normally closed switch 67 and conductor 58. The other path is comprised of conductor 61, normally open switch 31 on indicator 25, conductor 62, time delay means 63, conductor 64, relay winding 65 and conductor 66. The specific time delay means that is indicated by reference character 63 may easily be determined by one skilled in the art and it may be noted that the time delay which is utilized in carrying out the principles of my invention is that which is necessary to compensate for the fact that the grinding rasps 42 are angularly disposed from a vertical line extending downwardly from the axis of rotation of the wheel and tire of the automobile. Since the axle hop is measured along a vertical line by indicator 25, the tire must rotate a predetermined number of angular degrees before the grinder may be operative at the location at which the excessive deviation was observed.

OPERATION

Under operating conditions, the apparatus is set up generally as indicated on FIGS. 1 and 2 of the drawings with the automobile disposed in an elevated position by placing it on jack stands 14 and placing the tire grinding apparatus 16 under one of the wheels with the wheel substantially centered longitudinally of drum 35 and the axle disposed substantially vertically of the axis of rotation of drum 35. Indicator 25 is then brought into engagement with the recess normally found at the center of the axle of an automobile with the right end of feeler lever 27 in engagement in the position shown at the right side of FIG. 5. It is adjusted by utilization of elements 33 and 34 so that the dial indicator will indicate zero devication. Grinding wheels 42 are then disposed on shaft 43 a predetermined distance apart so that each will be disposed on one edge of the tread of the tire to be conditioned. Adjustment means 52 is then used to position grinder base 40 so that grinding wheels 42 are adjacent the tread of the tire to be conditioned but not in engagement therewith.

Motors 44 and 36 are then energized from a suitable source of energy by suitable means (not shown) and drum 35 will be operable preferably to cause wheel and tire 11 to rotate at a speed of about 24 revolutions per minute. As the wheel and tire rotate, the variations in radial force will be evidenced by vertical movement of the axle which is sensed by indicator 25 and a direct visual indication may be seen on dial indicator 32 and, simultaneously, switch 31 may be actuated to complete an electrical circuit from terminal 57 to time delay 63 for as long a period of time as the vertical displacement of axle 12 exceeds a predetermined allowable amount. In one operative embodiment of my invention, this was determined to be 0.010 inches and the adjustments provided for mounting of switch 31 and dial indicator on indicator 25 may be used to provide this standard of operation.

When a signal is provided to indicate an excessive amount of radial force, the energization of the time delay 63 ultimately results in energization of relay winding 65 to open normally closed switch 67 to deenergize solenoid 50 to allow grinder base 40 to be biased toward tire 11 through the biasing force of spring 48. This results in a substantially constant force and relay 50 will remain deenergized and a tire grinding operation performed during the time interval determined by the excessive force variation as evidenced by the axle hop exceeding the predetermined criteria.

It may be noted that there is no stop provided for grinder base 40 in its rotation about shaft 41 under the biasing force exerted by spring 48. It has been determined that a spring force of from 15 to 20 pounds is satisfactory to perform the actual conditioning of the tire and results in a faster overall operational characteristic of the apparatus as distinguished from other forms of material removal.

I claim:

1. An apparatus for conditioning a tire mounted on a wheel that is rotatably mounted on an axle of a vehicle comprising in combination; means operable to rotate a wheel and tire on a vehicular mounted axle; a source of signal indicative of the spindle hop of said axle in excess of a predetermined value; and grinding means operable in response to said signal for selectively grinding portions of the tread of a tire mounted on said axle.

2. The apparatus of claim 1 in which the means operable to rotate the wheel is disposed under the wheel of a vehicle and the source of signal includes means for measuring the distance between said first named means and the axle.

3. The apparatus of claim 2 in which the grinding means includes means for biasing the same towards the periphery of the tire and means for holding said grinding means out of engagement with said tire in the absence of said signal indicative of spindle hop in excess of a predetermined value.

4. The apparatus of claim 1 in which the grinding means includes means for biasing the same towards the periphery of the tire.

5. The apparatus of claim 1 in which the means operable to rotate the wheel, the source of signal and the grinding means are disposed on a base adapted to be disposed under the axis of said wheel whereby said means operable to rotate the wheel is supporting at least part of the weight of the vehicle.

6. The apparatus of claim 5 in which the base is portable.

7. The apparatus of claim 4 in which biasing means is adapted to provide a constant force.

8. The apparatus of claim 4 in which the biasing means is adjustable.

9. The apparatus of claim 3 in which the biasing means is adjustable.

10. The method of conditioning a tire on a wheel that is rotatably mounted on an axle therefor which comprises the steps of;

disposing one wheel of an automobile on a rotatable drum;

measuring the spindle hop of the axle for said wheel;

providing an adjustable tire grinder in proximity to the tire on said wheel; and moving said tire grinder into tread grinding relationship with said tire with a constant force, when the spindle hop of said axle exceeds a predetermined value.

* * * * *